United States Patent
Jinno et al.

(10) Patent No.: US 9,651,146 B2
(45) Date of Patent: May 16, 2017

(54) HYDRAULIC CONTROL DEVICE AND ABNORMALITY DETERMINATION METHOD FOR THE SAME

(71) Applicant: AISIN AW CO., LTD., Anjo-shi, Aichi-ken (JP)

(72) Inventors: Tomoya Jinno, Nishio (JP); Munehiro Tashiro, Okazaki (JP); Masamichi Yamaguchi, Anjo (JP); Tetsuya Shimizu, Anjo (JP); Kazunori Ishikawa, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 377 days.

(21) Appl. No.: 14/343,202

(22) PCT Filed: Nov. 15, 2012

(86) PCT No.: PCT/JP2012/079679
§ 371 (c)(1),
(2) Date: Mar. 6, 2014

(87) PCT Pub. No.: WO2013/073626
PCT Pub. Date: May 23, 2013

(65) Prior Publication Data
US 2014/0298783 A1 Oct. 9, 2014

(30) Foreign Application Priority Data
Nov. 16, 2011 (JP) ................. 2011-251115

(51) Int. Cl.
*F16H 61/12* (2010.01)
*F16H 61/686* (2006.01)
*F16H 59/68* (2006.01)

(52) U.S. Cl.
CPC .......... *F16H 61/12* (2013.01); *F16H 61/686* (2013.01); *F16H 2059/683* (2013.01); *F16H 2061/1212* (2013.01)

(58) Field of Classification Search
None
See application file for complete search history.

(56) References Cited

U.S. PATENT DOCUMENTS

| 6,375,591 B1* | 4/2002 | Wakahara | ............... F16H 61/12 |
| | | | 475/119 |
| 2006/0040791 A1 | 2/2006 | Nakajima et al. | |

(Continued)

FOREIGN PATENT DOCUMENTS

| JP | A-2006-57716 | 3/2006 |
| JP | A-2006-77892 | 3/2006 |

(Continued)

OTHER PUBLICATIONS

International Search Report issued in International Patent Application No. PCT/JP2012/079679 dated Feb. 19, 2013.

*Primary Examiner* — Robert A Siconolfi
*Assistant Examiner* — Ryan Dodd
(74) *Attorney, Agent, or Firm* — Oliff PLC

(57) ABSTRACT

A hydraulic control device that controls a hydraulic pressure for a plurality of friction engagement elements included in an automatic transmission mounted on a vehicle to establish a plurality of shift speeds, including: a plurality of pressure regulation valves, a plurality of hydraulic switches, speed change control means, and abnormality determination means.

7 Claims, 7 Drawing Sheets

(56) References Cited

U.S. PATENT DOCUMENTS

| | | | |
|---|---|---|---|
| 2007/0049457 A1* | 3/2007 | Sato | F16H 61/12 477/97 |
| 2007/0173373 A1 | 7/2007 | Kinugasa et al. | |

FOREIGN PATENT DOCUMENTS

| | | |
|---|---|---|
| JP | A-2007-187202 | 7/2007 |
| JP | A-2007-205439 | 8/2007 |
| JP | A-2007-309500 | 11/2007 |

* cited by examiner

FIG. 3

|  |  | C-1 | C-2 | C-3 | B-1 | B-2 | F-1 |
|---|---|---|---|---|---|---|---|
| P |  |  |  |  |  |  |  |
| REV |  |  |  | ○ |  | ○ |  |
| N |  |  |  |  |  |  |  |
| D | 1st | ○ |  |  |  | ● | ○ |
|  | 2nd | ○ |  |  | ○ |  |  |
|  | 3rd | ○ |  | ○ |  |  |  |
|  | 4th | ○ | ○ |  |  |  |  |
|  | 5th |  | ○ | ○ |  |  |  |
|  | 6th |  | ○ |  | ○ |  |  |

※ ○: ENGAGED,
● : ENGAGED WITH ENGINE BRAKE IN OPERATION

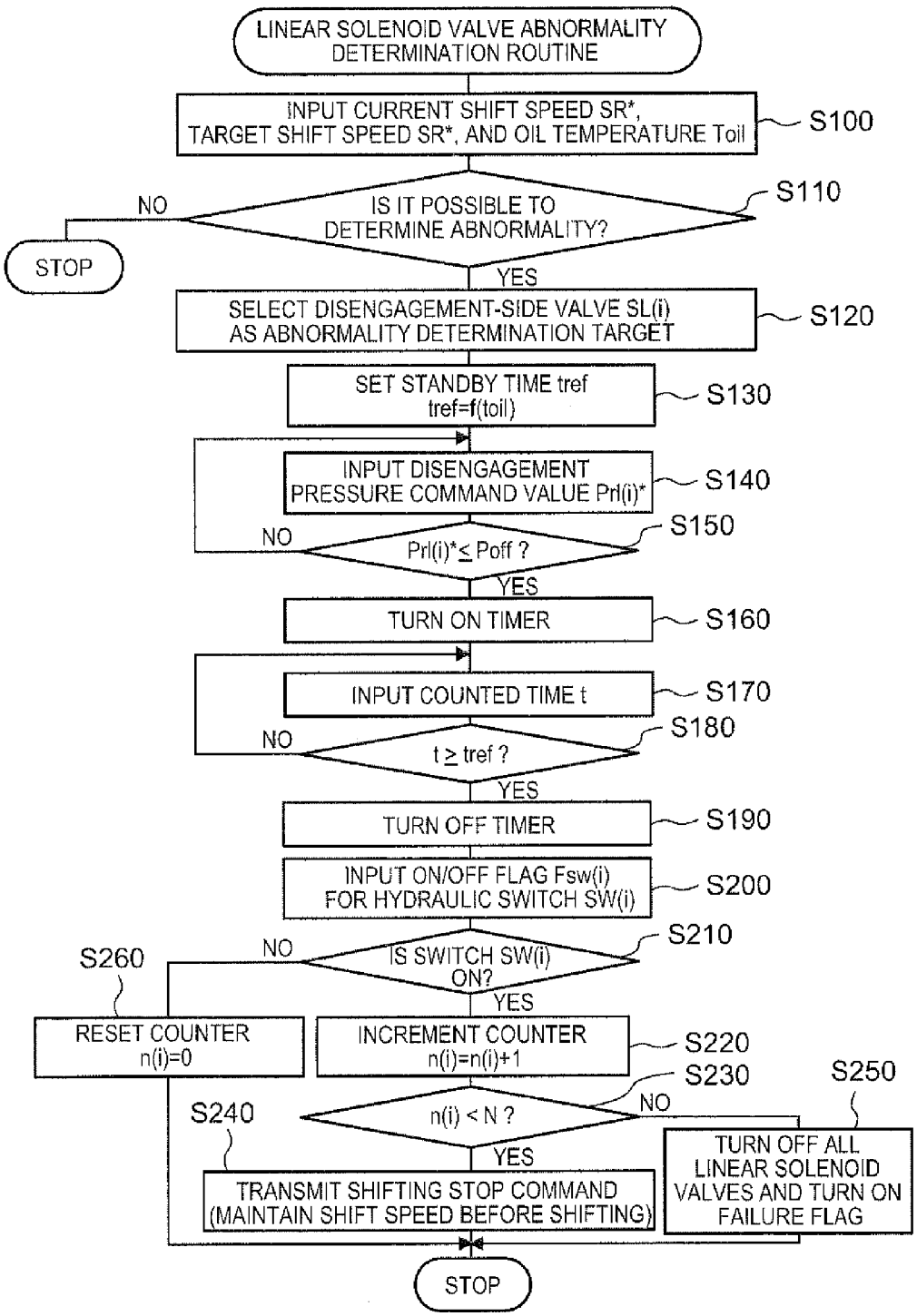

FIG. 6

| | SL1 | SL2 | SL3 | SL4 |
|---|---|---|---|---|
| UPSHIFT FROM FIRST SPEED TO SECOND SPEED | — | — | — | — |
| UPSHIFT FROM SECOND SPEED TO THIRD SPEED | — | — | — | ○ |
| UPSHIFT FROM THIRD SPEED TO FOURTH SPEED | — | — | ○ | — |
| UPSHIFT FROM FOURTH SPEED TO FIFTH SPEED | ○ | — | — | — |
| UPSHIFT FROM FIFTH SPEED TO SIXTH SPEED | — | — | ○ | — |
| DOWNSHIFT FROM SIXTH SPEED TO FIFTH SPEED | — | — | — | ○ |
| DOWNSHIFT FROM FIFTH SPEED TO FOURTH SPEED | — | — | ○ | — |
| DOWNSHIFT FROM FOURTH SPEED TO THIRD SPEED | — | ○ | — | — |
| DOWNSHIFT FROM THIRD SPEED TO SECOND SPEED | — | — | ○ | — |
| DOWNSHIFT FROM SECOND SPEED TO FIRST SPEED | — | — | — | ○ |

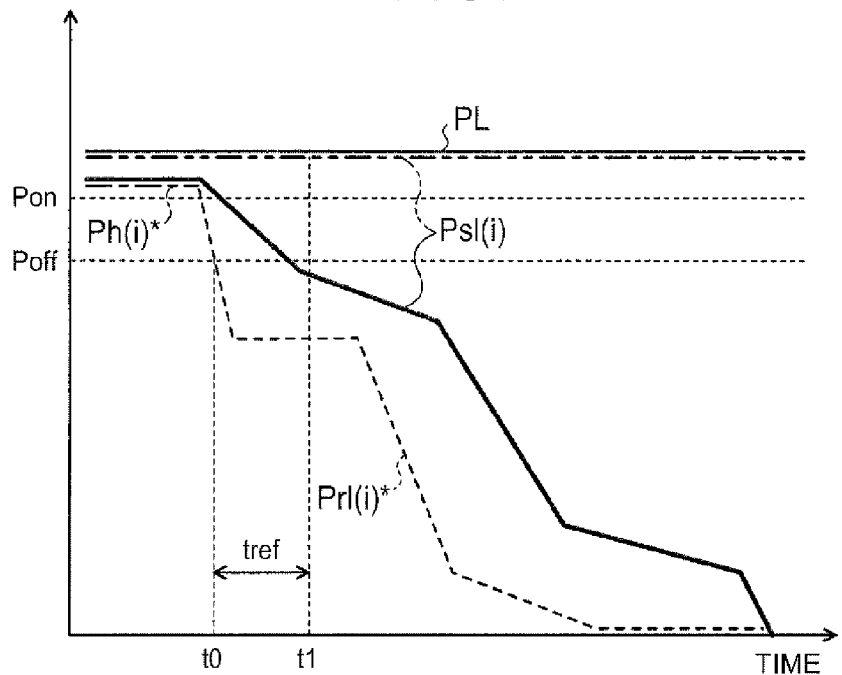

FIG. 7

HYDRAULIC CONTROL DEVICE AND ABNORMALITY DETERMINATION METHOD FOR THE SAME

TECHNICAL FIELD

The present invention relates to a hydraulic control device that controls a hydraulic pressure for a plurality of friction engagement elements included in an automatic transmission mounted on a vehicle to establish a plurality of shift speeds, and to an abnormality determination method for the hydraulic control device.

BACKGROUND ART

Hitherto, there has been known a hydraulic control device of this type in which an output command value is output to a solenoid valve to directly control a working hydraulic pressure for a friction engagement element corresponding to the solenoid valve (see Patent Document 1, for example). The hydraulic control device includes detection means for outputting a signal when a hydraulic pressure within an oil passage that connects between the solenoid valve and the friction engagement element corresponding to the solenoid valve reaches a pressure determined in advance, determination means for determining whether or not the hydraulic control device is abnormal on the basis of the signal from the detection means, prohibition means for prohibiting the determination means from making a determination when the output command value becomes equal to or more than a first value determined in advance, and permission means for permitting the determination means to make a determination after a time determined in advance has elapsed since the output command value becomes equal to or less than a second value determined in advance with the determination prohibited. Thus, in the hydraulic control device, a period in which an abnormality determination is prohibited and a period in which an abnormality determination is permitted are set for each of a plurality of solenoid valves. This makes it possible to determine the presence or absence of an abnormality for only a solenoid valve to which an output command value is not output during a change between shift speeds, that is, a solenoid valve not involved in shifting, by setting a period in which an abnormality determination is prohibited for a solenoid valve to which an output command value is output during a change between shift speeds.

RELATED-ART DOCUMENTS

Patent Documents

Patent Document 1: Japanese Patent Application Publication No. 2006-77892 (JP 2006-77892 A)

SUMMARY OF THE INVENTION

In order to secure further safety by more quickly determining the presence or absence of an abnormality of a pressure regulation valve such as a solenoid valve according to Patent Document 1, however, it is not sufficient to just determine the presence or absence of an abnormality of a pressure regulation valve not involved in shifting during a change between shift speeds, and it is desired to determine the presence or absence of an abnormality of a pressure regulation valve involved in shifting during a change between shift speeds.

It is therefore a main object of the hydraulic control device and the abnormality determination method for the hydraulic control device according to the present invention to make it possible to determine the presence or absence of an abnormality of a pressure regulation valve involved in shifting during a change between shift speeds.

In order to achieve the foregoing main object, the hydraulic control device and the abnormality determination method for the hydraulic control device according to the present invention adopt the following means.

The present invention provides a hydraulic control device that controls a hydraulic pressure for a plurality of friction engagement elements included in an automatic transmission mounted on a vehicle to establish a plurality of shift speeds, characterized by including:

a plurality of pressure regulation valves that each regulate a hydraulic pressure for a corresponding element among the plurality of friction engagement elements;

a plurality of hydraulic switches that are each provided for a corresponding one of the pressure regulation valves and that are each turned on when an output pressure of the corresponding pressure regulation valve is equal to or more than an on pressure determined in advance and turned off when the output pressure is equal to or less than an off pressure determined in advance;

speed change control means for setting a disengagement pressure command value for a disengagement-side pressure regulation valve corresponding to a disengagement-side friction engagement element to be disengaged in a change between the shift speeds; and abnormality determination means for determining that an abnormality is caused in the disengagement-side pressure regulation valve in the case where the hydraulic switch corresponding to the disengagement-side pressure regulation valve is on when a predetermined time has elapsed since the disengagement pressure command value for the disengagement-side pressure regulation valve becomes equal to or less than the off pressure for the hydraulic switch.

With the hydraulic control device, it is determined that an abnormality is caused in the disengagement-side pressure regulation valve in the case where the hydraulic switch corresponding to the disengagement-side pressure regulation valve is on when the predetermined time has elapsed since the disengagement pressure command value for the disengagement-side pressure regulation valve becomes equal to or less than the off pressure for the hydraulic switch, the disengagement-side pressure regulation valve corresponding to the disengagement-side friction engagement element to be disengaged in a change between the shift speeds. That is, in the case where the hydraulic switch has been turned on when the predetermined time has elapsed since the disengagement pressure command value for the disengagement-side pressure regulation valve becomes equal to or less than the off pressure for the hydraulic switch, the output pressure of the disengagement-side pressure regulation valve remains high when it should intrinsically be reduced even if there is a delay in response of the hydraulic pressure to the disengagement pressure command value, and thus the disengagement-side pressure regulation valve may be considered to be unable to reduce its output pressure because the disengagement-side pressure regulation valve is stuck open or the like, for example. Thus, with the hydraulic control device, it is possible to accurately determine the presence or absence of an abnormality of the disengagement-side pressure regulation valve involved in shifting during a change between shift speeds.

In addition, the on pressure for the hydraulic switch may be lower than a source pressure to be supplied to the disengagement-side pressure regulation valve during the change between the shift speeds, and the off pressure for the hydraulic switch may be lower than the on pressure, and higher than a holding pressure supplied from the disengagement-side pressure regulation valve to the disengagement-side friction engagement element before the change between the shift speeds under predetermined conditions. If the on pressure for the hydraulic switch is lower than the source pressure supplied to the disengagement-side pressure regulation valve during a change between shift speeds (from the start to the completion of the change), and in the case where the disengagement-side pressure regulation valve is unable to reduce its output pressure, the hydraulic switch corresponding to the disengagement-side pressure regulation valve is turned on when a change between shift speeds is started. If the off pressure for the hydraulic switch is lower than the on pressure, and higher than the holding pressure supplied from the disengagement-side pressure regulation valve to the disengagement-side friction engagement element before the change between the shift speeds under predetermined conditions, the hydraulic switch corresponding to the disengagement-side pressure regulation valve is off when the change between the shift speeds is started if no abnormality is caused in the disengagement-side pressure regulation valve in the change between the shift speeds under the predetermined conditions. Thus, according to such a configuration, it is possible to determine the presence or absence of an abnormality of the disengagement-side pressure regulation valve after the predetermined time elapses since the start of a change between shift speeds. Therefore, it is possible to more quickly determine the presence or absence of an abnormality of the disengagement-side pressure regulation valve compared to a case where the disengagement pressure command value for the disengagement-side pressure regulation valve becomes equal to or less than the off pressure for the hydraulic switch corresponding to the disengagement-side pressure regulation valve after a change between shift speeds is started.

Further, the off pressure for the hydraulic switch may be higher than the holding pressure supplied from the disengagement-side pressure regulation valve to the disengagement-side friction engagement element before the change between the shift speeds in the case where an accelerator off state is continued since before the change between the shift speeds. Consequently, it is possible to more quickly determine the presence or absence of an abnormality of the disengagement-side pressure regulation valve in a change between shift speeds performed during continuation of the accelerator off state, in which a large speed reduction shock tends to be caused in the case where the disengagement-side friction engagement element is not disengaged.

In addition, in the case where a source pressure supplied to the disengagement-side pressure regulation valve before the change between the shift speeds is lower than the on pressure for the hydraulic switch, the source pressure supplied to the disengagement-side pressure regulation valve during the change between the shift speeds may be set to be higher than the on pressure. Consequently, it is possible to reliably turn on the hydraulic switch corresponding to the disengagement-side pressure regulation valve after the start of a change between shift speeds in the case where the disengagement-side pressure regulation valve is unable to reduce its output pressure.

Further, the predetermined time may be set to be longer as a temperature of hydraulic oil is lower. Consequently, it is possible to more adequately execute an abnormality determination for the disengagement-side pressure regulation valve by setting the predetermined time so as to match the viscosity of hydraulic oil.

In addition, in the case where a holding pressure supplied from the disengagement-side pressure regulation valve to the disengagement-side friction engagement element before the change between the shift speeds is lower than the off pressure for the hydraulic switch, the predetermined time may be set to be shorter than that for a case where the holding pressure is higher than the off pressure. Consequently, in the case where the holding pressure supplied from the disengagement-side pressure regulation valve to the disengagement-side friction engagement element before a change between shift speeds is lower than the off pressure for the hydraulic switch, it is possible to even more quickly determine the presence or absence of an abnormality of the disengagement-side pressure regulation valve by reducing the predetermined time by the time taken by the holding pressure to fall below the off pressure.

The present invention also provides an abnormality determination method for a hydraulic control device having a plurality of pressure regulation valves that each regulate a hydraulic pressure for a corresponding element among a plurality of friction engagement elements included in an automatic transmission mounted on a vehicle to establish a plurality of shift speeds, and a plurality of hydraulic switches that are each provided for a corresponding one of the pressure regulation valves and that are each turned on when an output pressure of the corresponding pressure regulation valve is equal to or more than an on pressure determined in advance and turned off when the output pressure is equal to or less than an off pressure determined in advance, the abnormality determination method including:

determining that an abnormality is caused in a disengagement-side pressure regulation valve in the case where the hydraulic switch corresponding to the disengagement-side pressure regulation valve is on when a predetermined time has elapsed since a disengagement pressure command value for the disengagement-side pressure regulation valve becomes equal to or less than the off pressure for the hydraulic switch, the disengagement-side pressure regulation valve corresponding to a disengagement-side friction engagement element to be disengaged along with a change between the shift speeds.

According to the method, it is possible to accurately determine the presence or absence of an abnormality of the disengagement-side pressure regulation valve involved in shifting during a change between shift speeds.

BRIEF DESCRIPTION OF THE DRAWINGS

FIG. 3 is an operation table illustrating the relationship between each shift speed of the automatic transmission 25 and the respective operating states of clutches and brakes.

FIG. 5 is a flowchart illustrating an example of a linear solenoid valve abnormality determination routine.

FIG. 6 illustrates an example of an abnormality determination target setting map.

FIG. 7 is a time chart illustrating how a hydraulic pressure Psl(i) from a disengagement-side pressure regulation valve SL(i) etc. are varied in a change between shift speeds along with a transition from an accelerator on state to an accelerator off state.

MODES FOR CARRYING OUT THE INVENTION

Now, an embodiment of the present invention will be described below.

Figure 1:
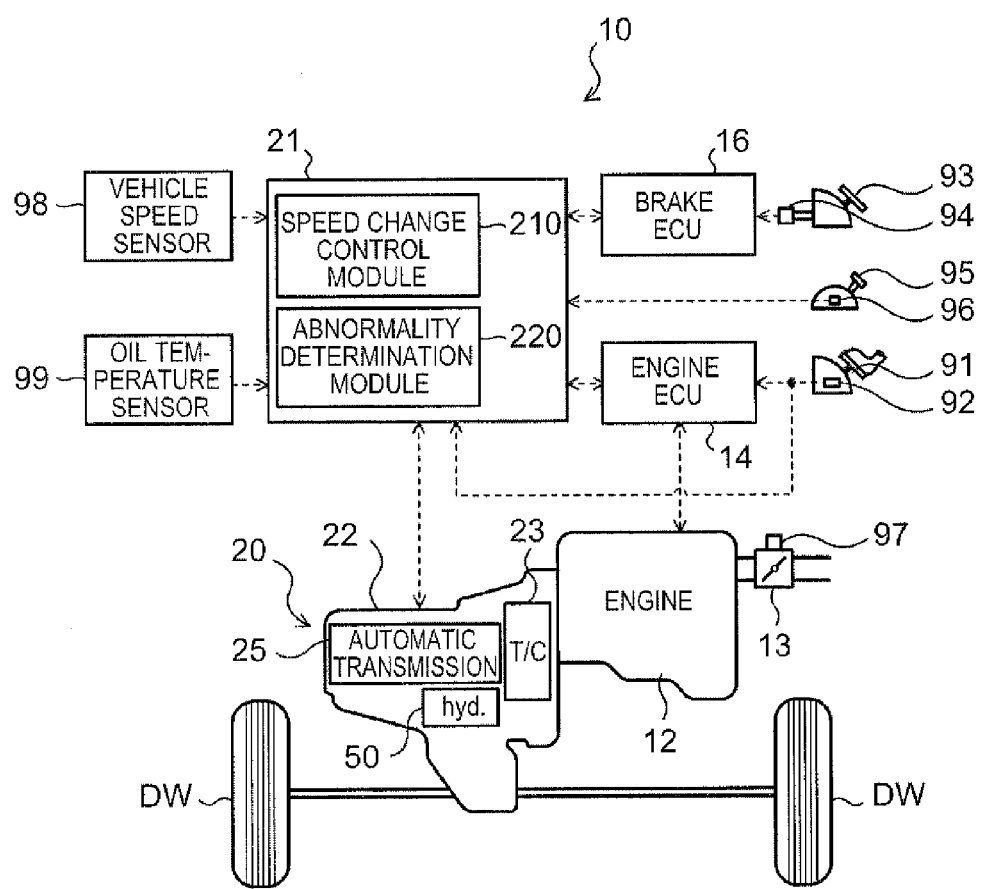
FIG. 1 illustrates a schematic configuration of an automobile 10 which is a vehicle incorporating a hydraulic control device 50 according to the present invention.

FIG. 1 illustrates a schematic configuration of an automobile 10 which is a vehicle incorporating a hydraulic control device 50 according to the present invention. The automobile 10 illustrated in the drawing includes an engine 12 serving as a power source which is an internal combustion engine that outputs power through explosive combustion of a mixture of a hydrocarbon fuel, such as gasoline and light oil, and air, an engine electronic control unit (hereinafter referred to as an "engine ECU") 14 that controls the engine 12, a brake electronic control unit (hereinafter referred to as a "brake ECU") 16 that controls an electronically controlled hydraulic brake unit (not illustrated), a power transfer device 20 connected to a crankshaft of the engine 12 to transfer power from the engine 12 to left and right drive wheels DW, and so forth. The power transfer device 20 has a torque converter 23, a stepped automatic transmission 25, the hydraulic control device 50, and a speed change electronic control unit (hereinafter referred to as a "speed change ECU") 21 that controls such components.

The engine ECU 14 is structured as a microcomputer including a CPU (not illustrated) as a main component, and has a ROM that stores various programs, a RAM that temporarily stores data, input and output ports and a communication port (not illustrated), and so forth besides the CPU. As illustrated in FIG. 1, the engine ECU 14 receives inputs such as an accelerator operation amount Acc from an accelerator pedal position sensor 92 that detects the amount of depression (amount of operation) of an accelerator pedal 91, a vehicle speed V from a vehicle speed sensor 98, signals from various sensors such as a crankshaft position sensor (not illustrated) that detects the rotational position of the crankshaft, and signals from the brake ECU 16 and the speed change ECU 21. The engine ECU 14 controls an electronically controlled throttle valve 13, and a fuel injection valve, an ignition plug, and so forth (not illustrated) on the basis of the received signals.

The brake ECU 16 is also structured as a microcomputer including a CPU (not illustrated) as a main component, and has a ROM that stores various programs, a RAM that temporarily stores data, input and output ports and a communication port (not illustrated), and so forth besides the CPU. As illustrated in FIG. 1, the brake ECU 16 receives inputs such as a master cylinder pressure detected by a master cylinder pressure sensor 94 when a brake pedal 93 is depressed, the vehicle speed V from the vehicle speed sensor 98, signals from various sensors (not illustrated), and signals from the engine ECU 14 and the speed change ECU 21. The brake ECU 16 controls a brake actuator (hydraulic actuator) (not illustrated) etc. on the basis of the received signals.

The speed change ECU 21 is also structured as a microcomputer including a CPU (not illustrated) as a main component, and includes a ROM that stores various programs, a RAM that temporarily stores data, input and output ports and a communication port (not illustrated), and so forth besides the CPU. As illustrated in FIG. 1, the speed change ECU 21 receives inputs such as the accelerator operation amount Acc from the accelerator pedal position sensor 92, the vehicle speed V from the vehicle speed sensor 98, a shift range SR from a shift range sensor 96 that detects the operating position of a shift lever 95 for selecting a desired shift range from a plurality of shift ranges, signals from various sensors (not illustrated) such as an oil temperature sensor 99 that detects an oil temperature Toil of hydraulic oil of the hydraulic control device 50 and a rotational speed sensor that detects an input rotational speed Ni of the automatic transmission 25 (the rotational speed of a turbine runner 23b or an input shaft 26), and signals from the engine ECU 14 and the brake ECU 16. The speed change ECU 21 controls the torque converter 23 and the automatic transmission 25, that is, the hydraulic control device 50, on the basis of the received signals.

In the embodiment, the shift ranges that can be selected via the shift lever 95 include a parking range (P range) to be selected to park the vehicle, a reverse range (R range) for reverse travel, a neutral range (N range) to establish a neutral state, a drive range for normal forward travel, and a sport range (S range) in which a driver is allowed to select a desired shift speed. Once the shift lever 95 is set to the S range, the shift lever 95 can be set to an upshift command position or a downshift command position. The shift speed can be upshifted by one step each time the shift lever 95 is set to the upshift command position, and downshifted by one step each time the shift lever 95 is set to the downshift command position. In the automobile 10 according to the embodiment, further, an upshift command switch and a downshift command switch are disposed in the vicinity of a steering wheel so that a desired shift speed can be selected from a plurality of shift speeds by operating the switches.

Figure 2:
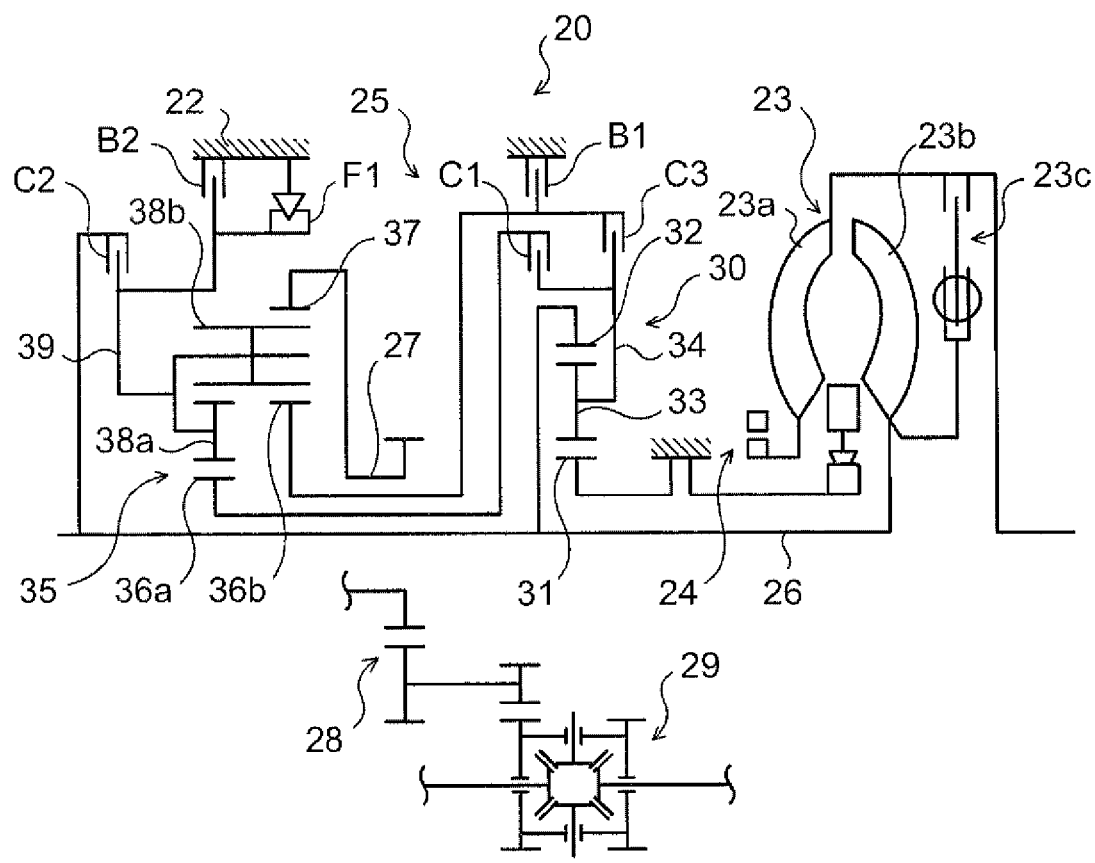
FIG. 2 illustrates a schematic configuration of a power transfer device 20 including an automatic transmission 25 that is actuated by a hydraulic pressure from the hydraulic control device 50.

As illustrated in FIG. 2, the power transfer device 20 includes the torque converter 23 housed inside a transmission case 22, an oil pump 24, the automatic transmission 25, a differential mechanism (differential gear) 29, the hydraulic control device 50, and so forth. The torque converter 23 includes a pump impeller 23a on the input side connected to the crankshaft of the engine 12, the turbine runner 23b on the output side connected to the input shaft (input member) 26 of the automatic transmission 25, and a lock-up clutch 23c. The oil pump 24 is structured as a gear pump including a pump assembly composed of a pump body and a pump cover, and an externally toothed gear connected to the pump impeller 23a of the torque converter 23 via a hub. When the externally toothed gear is rotated by power from the engine 12, the oil pump 24 suctions hydraulic oil (ATF) reserved in an oil pan (not illustrated) to pump the hydraulic oil to the hydraulic control device 50.

The automatic transmission 25 is structured as a 6-speed transmission. As illustrated in FIG. 2, the automatic transmission 25 includes a single-pinion type planetary gear mechanism 30, a Ravigneaux type planetary gear mechanism 35, and three clutches C1, C2, and C3, two brakes B1 and B2, and a one-way clutch F1 that change a power transfer path from the input side to the output side. The single-pinion type planetary gear mechanism 30 has a sun gear 31 which is an externally toothed gear held stationary with respect to the transmission case 22, a ring gear 32 which is an internally toothed gear disposed concentrically with the sun gear 31 and connected to the input shaft 26, a plurality of pinion gears 33 meshed with the sun gear 31 and meshed with the ring gear 32, and a carrier 34 that rotatably and revolvably holds the plurality of pinion gears 33. The Ravigneaux type planetary gear mechanism 35 includes two sun gears 36a and 36b which are each an externally toothed gear, a ring gear 37 which is an internally toothed gear held stationary with respect to an output shaft (output member) 27 of the automatic transmission 25, a plurality of short pinion gears 38a meshed with the sun gear 36a, a plurality of long pinion gears 38b meshed with the sun gear 36b and the plurality of short pinion gears 38a and meshed with the ring gear 37, and a carrier 39 that rotatably and revolvably holds the plurality of short pinion gears 38a and the plurality of long pinion gears 38b, which are coupled to each other, and that is supported by the transmission case 22 via the one-way clutch F1. The output shaft 27 of the automatic transmission 25 is connected to drive wheels DW via a gear mechanism 28 and the differential mechanism 29.

The clutch C1 is a hydraulic clutch (friction engagement element) that has a plurality of friction plates, mating plates, and a hydraulic servo structured from an oil chamber supplied with hydraulic oil and so forth, and that is capable of fastening and unfastening the carrier 34 of the single-pinion type planetary gear mechanism 30 and the sun gear 36a of the Ravigneaux type planetary gear mechanism 35 to and from each other. The clutch C2 is a hydraulic clutch that has a plurality of friction plates, mating plates, and a hydraulic servo structured from an oil chamber supplied with hydraulic oil and so forth, and that is capable of fastening and unfastening the input shaft 26 and the carrier 39 of the Ravigneaux type planetary gear mechanism 35 to and from each other. The clutch C3 is a hydraulic clutch that has a plurality of friction plates, mating plates, and a hydraulic servo structured from an oil chamber supplied with hydraulic oil and so forth, and that is capable of fastening and unfastening the carrier 34 of the single-pinion type planetary gear mechanism 30 and the sun gear 36b of the Ravigneaux type planetary gear mechanism 35 to and from each other. The brake B1 is a hydraulic brake that has a plurality of friction plates, mating plates, and a hydraulic servo structured from an oil chamber supplied with hydraulic oil and so forth, and that is capable of holding the sun gear 36b of the Ravigneaux type planetary gear mechanism 35 stationary with respect to the transmission case 22 and canceling such a stationary state of the sun gear 36b with respect to the transmission case 22. The brake B2 is a hydraulic brake that has a plurality of friction plates, mating plates, and a hydraulic servo structured from an oil chamber supplied with hydraulic oil and so forth, and that is capable of holding the carrier 39 of the Ravigneaux type planetary gear mechanism 35 stationary with respect to the transmission case 22 and canceling such a stationary state of the carrier 39 with respect to the transmission case 22.

The clutches C1 to C3 and the brakes B1 and B2 operate with hydraulic oil supplied thereto and discharged therefrom by the hydraulic control device 50. FIG. 3 is an operation table illustrating the relationship between each shift speed of the automatic transmission 25 and the respective operating states of the clutches C1 to C3 and the brakes B1 and B2. The automatic transmission 25 provides first to sixth forward speeds and one reverse speed when the clutches C1 to C3 and the brakes B1 and B2 are brought into the respective states illustrated in the operation table of FIG. 3.

Figure 4:
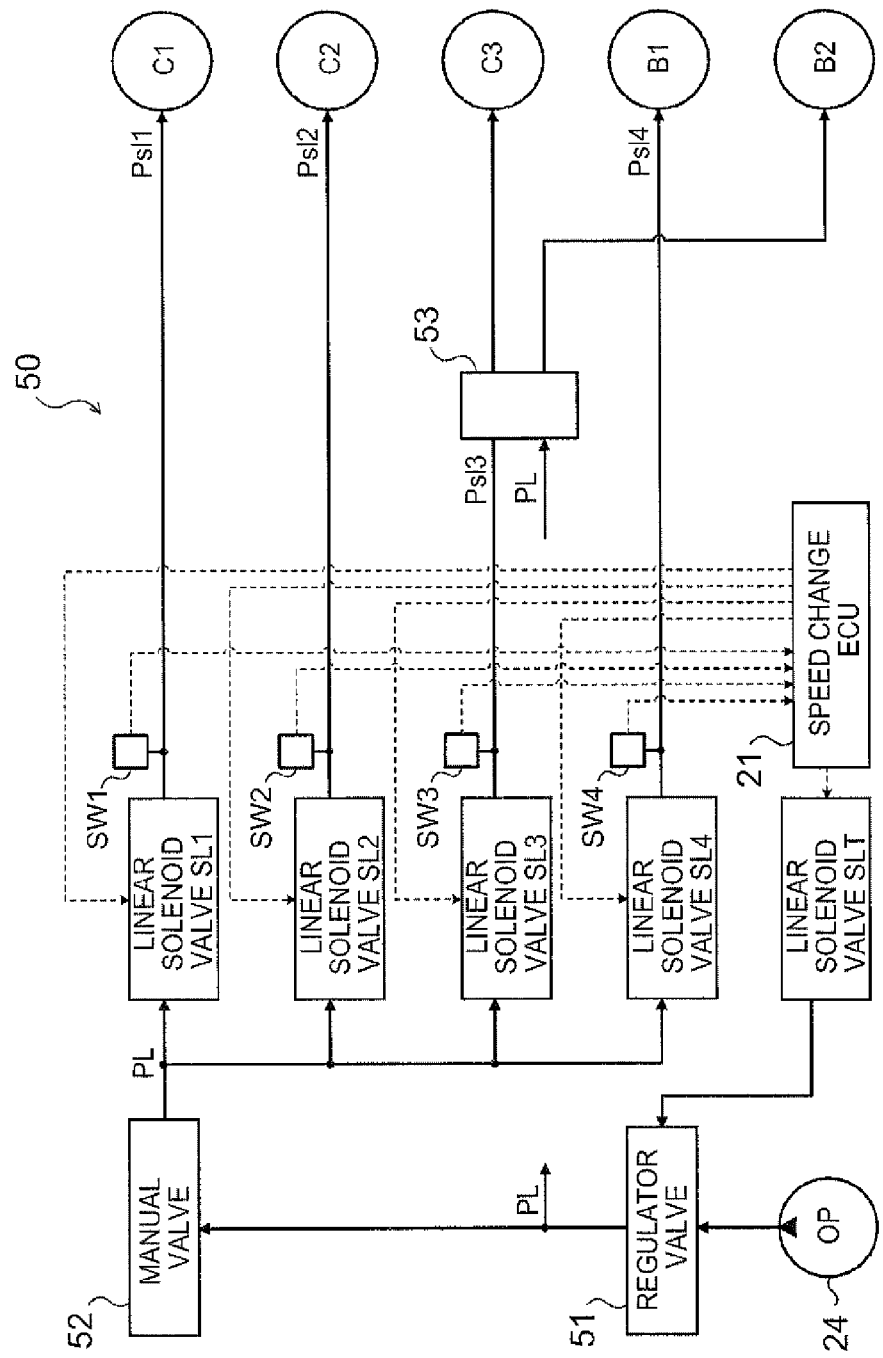
FIG. 4 is a system diagram illustrating the hydraulic control device 50.

FIG. 4 is a system diagram illustrating the hydraulic control device 50. The hydraulic control device 50 is connected to the oil pump 24 discussed above which is driven by power from the engine 12 to suction hydraulic oil from an oil pan to discharge the hydraulic oil, and generates a hydraulic pressure required for the torque converter 23 and the automatic transmission 25 and supplies the hydraulic oil to portions to be lubricated such as various bearings. As illustrated in FIG. 4, the hydraulic control device 50 includes a primary regulator valve 51 that regulates the pressure of hydraulic oil from the oil pump 24 to generate a line pressure PL, a manual valve 52 that switches the supply destination of the line pressure PL from the primary regulator valve 51 in accordance with the operating position of the shift lever 95, an application control valve 53, and a first linear solenoid valve SL1, a second linear solenoid valve SL2, a third linear solenoid valve SL3, a fourth linear solenoid valve SL4, and so forth each regulates the line pressure PL as a source pressure supplied from the manual valve 52 (primary regulator valve 51) to generate a hydraulic pressure for the corresponding clutch etc.

The primary regulator valve 51 is driven by a hydraulic pressure from a linear solenoid valve SLT controlled by the speed change ECU 21 so as to regulate the pressure of hydraulic oil from the oil pump 24 side (for example, a modulator valve that regulates the line pressure PL to output a constant hydraulic pressure) in accordance with the accelerator operation amount Ace or an opening degree THR of the throttle valve 13.

The manual valve 52 has a spool that is axially slidable in conjunction with the shift lever 95, an input port to which the line pressure PL is supplied, a drive range output port that communicates with respective input ports of the first to fourth linear solenoid valves SL1 to SL4 via an oil passage, a reverse range output port, and so forth (none of which is illustrated). When the driver selects a forward travel shift range such as the D range and the S range, the spool of the manual valve 52 allows the input ports to communicate with only the drive range output port so that the line pressure PL is supplied to the first to fourth linear solenoid valves SL1 to SL4 as a drive range pressure. When the driver selects the R range, meanwhile, the spool of the manual valve 52 allows the input ports to communicate with only the reverse range output port. When the driver selects the P range or the N range, further, the spool of the manual valve 52 blocks communication between the input ports and the drive range output port and the reverse range output port.

The application control valve 53 is a spool valve capable of selectively establishing a first state in which a hydraulic pressure from the third linear solenoid valve SL3 is supplied to the clutch C3, a second state in which the line pressure PL from the primary regulator valve 51 is supplied to the clutch C3 and the line pressure PL (reverse range pressure) from the reverse range output port of the manual valve 52 is supplied to the brake B2, a third state in which the line pressure PL (reverse range pressure) from the reverse range output port of the manual valve 52 is supplied to the clutch C3 and the brake B2, and a fourth state in which a hydraulic pressure from the third linear solenoid valve CL3 is supplied to the brake B2.

The first linear solenoid valve SL1 is a normally closed linear solenoid valve that regulates the line pressure PL from the manual valve 52 in accordance with an applied current to generate a hydraulic pressure Psl1 for the clutch C1. The second linear solenoid valve SL2 is a normally closed linear solenoid valve that regulates the line pressure PL from the manual valve 52 in accordance with an applied current to generate a hydraulic pressure Psl2 for the clutch C2. The third linear solenoid valve SL3 is a normally closed linear solenoid valve that regulates the line pressure PL from the manual valve 52 in accordance with an applied current to generate a hydraulic pressure Psl3 for the clutch C3 or the brake B2. The fourth linear solenoid valve SL4 is a normally closed linear solenoid valve that regulates the line pressure PL from the manual valve 52 in accordance with an applied current to generate a hydraulic pressure Psl4 for the brake B1. That is, hydraulic pressures for the clutches C1 to C3 and the brakes B1 and B2 which are friction engagement elements of the automatic transmission 25 are each directly controlled (set) by a corresponding one of the first, second, third, and fourth linear solenoid valve SL1, SL2, SL3, and SL4. In the embodiment, from the viewpoint of the cost and the ease of design, the first to fourth linear solenoid valves SL1 to SL4 have the same size and the same maximum output pressure.

The first to fourth linear solenoid valves SL1 to SL4 discussed above (respective currents applied thereto) are controlled by the speed change ECU 21. As illustrated in FIG. 1, the speed change ECU 21 includes a speed change control module 210, constructed as a functional block, that controls the first to fourth linear solenoid valves SL1 to SL4 on the basis of the accelerator operation amount Acc (or the opening degree THR of the throttle valve 13), the vehicle speed V, and a speed change line diagram (not illustrated) determined in advance through cooperation between hardware such as the CPU, the ROM, and the RAM and software such as a control program installed in the ROM. That is, in order to establish a target shift speed SR* corresponding to the accelerator operation amount Acc (or the opening degree THR of the throttle valve 13) and the vehicle speed V acquired from the speed change line diagram described above in a change between shift speeds, the speed change control module 210 sets an engagement pressure command value Peg* for one (engagement-side pressure regulation valve) of the first to fourth linear solenoid valves SL1 to SL4 corresponding to a clutch (excluding the one-way clutch) or a brake to be engaged along with the change between shift speeds and a disengagement pressure command value Prl(i)* (where "i" is a value of 1, 2, 3, or 4) for one (disengagement-side pressure regulation valve) of the first to fourth linear solenoid valves SL1 to SL4 corresponding to a clutch (excluding the one-way clutch) or a brake to be disengaged along with the change between shift speeds. In addition, the speed change control module 210 sets a holding pressure command value Ph(i)* for one or two of the first to fourth linear solenoid valves SL1 to SL4 corresponding to a clutch or a brake being engaged during the change between shift speeds or after the target shift speed SR* is established.

In order to determine the presence or absence of an abnormality of the first to fourth linear solenoid valves SL1 to SL4, further, the hydraulic control device 50 includes hydraulic switches SW1 to SW4 having a known configuration and provided for the first to fourth linear solenoid valves SL1 to SL4, respectively, as illustrated in FIG. 4. The hydraulic switch SW1 has an input port (not illustrated) connected to an output port of the first linear solenoid valve SL1, and is connected to the speed change ECU 21 via a signal line. The hydraulic switch SW2 has an input port (not illustrated) connected to an output port of the second linear solenoid valve SL2, and is connected to the speed change ECU 21 via a signal line. The hydraulic switch SW3 has an input port (not illustrated) connected to an output port of the third linear solenoid valve SL3, and is connected to the speed change ECU 21 via a signal line. The hydraulic switch SW4 has an input port (not illustrated) connected to an output port of the fourth linear solenoid valve SL4, and is connected to the speed change ECU 21 via a signal line.

The hydraulic switches SW1 to SW4 basically have the same specifications, and are each turned on to transmit an on signal to the speed change ECU 21 when an output pressure (the hydraulic pressure Psl1, Psl2, Psl3, or Psl4) of a corresponding one of the first, second, third, and fourth linear solenoid valves SL1, SL2, SL3, and SL4 is equal to or more than an on pressure Pon determined in advance, and turned off when such an output pressure is equal to or less than an off pressure Poff determined in advance. In the embodiment, the on pressure Pon for the hydraulic switches SW1 to SW4 is determined to be lower than the line pressure PL generated by the primary regulator valve 51, that is, the source pressure supplied to the first to fourth linear solenoid valves SL1 to SL4, during a change between shift speeds (from the start to the completion of shifting). That is, in the embodiment, the value (during-shifting required value) of the line pressure PL required during a change between shift speeds has been determined in advance in accordance with the shift speed or the like, and the on pressure Pon for the hydraulic switches SW1 to SW4 is determined to be lower than the during-shifting required value. The speed change ECU 21 (speed change control module 210) controls the linear solenoid valve SLT such that the line pressure PL, that is, the source pressure to be supplied to the first to fourth linear solenoid valves SL1 to SL4, at least does not fall below the during-shifting required value during a change between shift speeds. Consequently, in the case where the line pressure PL as the source pressure to be supplied to one or two of the first to fourth linear solenoid valves SL1 to SL4 corresponding to a clutch or a brake being engaged before a change between shift speeds is lower than the on pressure Pon for the hydraulic switches SW1 to SW4, the line pressure PL (=during-shifting required value) as the source pressure to be supplied to the first to fourth linear solenoid valves SL1 to SL4 during a change between shift speeds (from the start to the completion of shifting) is made higher than the on pressure Pon.

The of pressure Poff for the hydraulic switches SW1 to SW4 is determined to be lower than the on pressure Pon described above, and higher than a holding pressure output from one or two of the first to fourth linear solenoid valves SL1 to SL4 to maintain engagement of one or two of the clutches C1 to C3 and the brakes B1 and B2 which has or have been engaged since before a change between shift speeds (so-called downcoasting or manual downshifting) in the case where an accelerator off state in which depression of the accelerator pedal 91 is released (a state in which the throttle opening degree THR is generally all closed) is continued (for example, during coasting) since before the change between shift speeds. The speed change ECU 21 includes an abnormality determination module 220, constructed as a functional block, that determines the presence or absence of an abnormality of the first to fourth linear solenoid valves SL1 to SL4 described above included in the hydraulic control device 50 through cooperation between hardware such as the CPU, the ROM, and the RAM and software such as a control program installed in the ROM on the basis of signals from the hydraulic switches SW1 to SW4.

Next, a procedure for determining an abnormality of the first to fourth linear solenoid valves SL1 to SL4 performed by the abnormality determination module 220 will be described with reference to FIGS. 5 to 8. FIG. 5 is a flowchart illustrating an example of a linear solenoid valve abnormality determination routine executed by the abnormality determination module 220 of the speed change ECU 21. The routine of FIG. 5 makes it possible to determine the presence or absence of an abnormality of the first, second, third, or fourth linear solenoid valve SL1, SL2, SL3, or SL4 corresponding to one of the clutches C1 to C3 and the brake B1 to be disengaged along with a change between shift speeds (an upshift or a downshift) on the basis of signals (on signals) from the hydraulic switches SW1 to SW4. The routine of FIG. 5 is started substantially at the same time as control for a change between shift speeds is started by the speed change control module 210.

To start the linear solenoid valve abnormality determination routine of FIG. 5, the abnormality determination module 220 executes an input process for data necessary for an abnormality determination such as a current shift speed SR established in the automatic transmission 25, the target shift speed SR*, and the oil temperature Toil from the oil temperature sensor 99 (step S100). The current shift speed SR of the automatic transmission 25 and the target shift speed SR* have been set by the speed change control module 210, and stored in a predetermined storage area of the speed change ECU 21.

After the process in step S100, the abnormality determination module 220 determines whether or not to execute an abnormality determination for the first to fourth linear solenoid valves SL1 to SL4 on the basis of the current shift speed SR and the target shift speed SR* input in step S100 and an abnormality determination target setting map stored in the ROM of the speed change ECU 21 and illustrated in FIG. 6 (step S110). That is, the routine is configured to determine the presence or absence of an abnormality of the first, second, third, or fourth linear solenoid valve SL1, SL2, SL3, or SL4 corresponding to a clutch or a brake to be disengaged along with a change between shift speeds on the basis of signals from the hydraulic switches SW1 to SW4 as discussed above. In upshifting the automatic transmission 25 from the first speed to the second speed, there is no clutch or the like (excluding the one-way clutch) to be disengaged along with a change between shift speeds (excluding an occasion where the engine brake is used) as seen from FIG. 3. Therefore, in the case where the current shift speed SR input in step S100 is the first speed and the target shift speed SR* is the second speed, the abnormality determination module 220 does not execute the processes in and after step S110, and terminates the routine.

In the case where the current shift speed SR input in step S100 is not the first speed and the target shift speed SR* is not the second speed, in contrast, the abnormality determination module 220 selects one (hereinafter referred to as a disengagement-side pressure regulation valve SL(i)) of the first to fourth linear solenoid valves SL1 to SL4 corresponding to a clutch or a brake (disengagement-side engagement element) to be disengaged along with shifting from the current shift speed SR to the target shift speed SR* from the abnormality determination target setting map of FIG. 6, and sets the selected linear solenoid valve as an abnormality determination target (step S120). For example, in the case where the current shift speed SR is the fourth speed and the target shift speed SR* is the fifth speed, the disengagement-side pressure regulation valve SL(i) is the first linear solenoid valve SL1 (i=1) which corresponds to the clutch C1 to be disengaged along with an upshift from the fourth speed to the fifth speed. In the case where the current shift speed SR is the fourth speed and the target shift speed SR* is the third speed, meanwhile, the disengagement-side pressure regulation valve SL(i) is the second linear solenoid valve SL2 (i=2) which corresponds to the clutch C2 to be disengaged along with a downshift from the fourth speed to the third speed.

When the disengagement-side pressure regulation valve SL(i) is set as the abnormality determination target, the abnormality determination module 220 sets a standby time (predetermined time) tref on the basis of the oil temperature Toil input in step S100 (step S130). In the embodiment, the relationship between the oil temperature Toil and the standby time tref is determined in advance such that the standby time tref is longer as the oil temperature Toil is lower in consideration of the response to a pressure command value for the first to fourth linear solenoid valves SL1 to SL4, and stored in the ROM of the speed change ECU 21 as a standby time setting map (not illustrated). Then, the abnormality determination module 220 reads the time corresponding to the oil temperature Toil input in step S100 from the standby time setting map, and sets the read time as the standby time tref.

Then, the abnormality determination module 220 inputs the disengagement pressure command value Prl(i)* for the disengagement-side pressure regulation valve SL(i) from the speed change control module 210 (step S140), and determines whether or not the disengagement pressure command value Prl(i)* has become equal to or less than the off pressure Poff for the hydraulic switch SW(i), that is, the hydraulic switches SW1 to SW4, corresponding to the disengagement-side pressure regulation valve SL(i) (step S150). The abnormality determination module 220 executes the processes in steps S140 and S150 repeatedly at intervals of a predetermined time. If it is determined in step S150 that the disengagement pressure command value Prl(i)* has become equal to or less than the off pressure Poff, the abnormality determination module 220 turns on a timer (not illustrated) (step S160). After the timer is turned on, the abnormality determination module 220 inputs a counted time t counted by the timer (step S170), and determines whether or not the counted time t is equal to or more than the standby time tref set in step S130, that is, whether or not the standby time tref has elapsed since the disengagement pressure command value Prl(i)* for the disengagement-side pressure regulation valve SL(i) becomes equal to or less than the off pressure Poff for the hydraulic switch SW(i) (step S180).

The abnormality determination module 220 executes the processes in steps S170 and S180 repeatedly at intervals of a predetermined time. If it is determined in step S180 that the counted time t has become equal to or more than the standby time tref, the abnormality determination module 220 turns off the timer (step S190), and inputs the value of an ON/OFF flag Fsw(i) for the hydraulic switch SW(i) corresponding to the disengagement-side pressure regulation valve SL(i) (step S200). The ON/OFF flag Fsw(i) is provided for each of the hydraulic switches SW1 to SW4, and set to a value of 1 and stored in a predetermined storage area by the speed change ECU 21 while the speed change ECU 21 is receiving an on signal from the hydraulic switch SW(i), and set to a value of 0 and stored in the predetermined storage area when the hydraulic switch SW(i) is turned off to no longer output an on signal.

Then, the abnormality determination module 220 determines whether or not the ON/OFF flag Fsw(i) for the hydraulic switch SW(i) has a value of 1, that is, whether or not the hydraulic switch SW(i) is on (step S210). When the determination in step S210 is performed, the standby time tref has elapsed since the disengagement pressure command value Prl(i)* for the disengagement-side pressure regulation valve SL(i) becomes equal to or less than the off pressure Poff for the hydraulic switch SW(i), and the hydraulic switch SW(i) has been turned off when a positive determination is made in step S190 even if there is a delay in response to the disengagement pressure command value Prl(i)* if no abnormality is caused in the disengagement-side pressure regulation valve SL(i). Therefore, in the case where the ON/OFF flag Fsw(i) has a value of 0 and the hydraulic switch SW(i) is off, the abnormality determination module 220 considers that no abnormality is caused in the disengagement-side pressure regulation valve SL(i), resets a counter corresponding to the hydraulic switch SW(i), among a plurality of counters (not illustrated) prepared for the hydraulic switches SW1 to SW4 (step S260), and terminates the routine.

FIG. 7 illustrates how the hydraulic pressure Prl(i) from the disengagement-side pressure regulation valve SL(i) etc. are varied in an upshift between shift speeds (for example, a so-called off upshift from the fourth speed to the fifth speed) along with a transition from an accelerator on state to an accelerator off state. In the example of FIG. 7, before control for an upshift between shift speeds is started by the speed change control module 210, the line pressure PL supplied to the disengagement-side pressure regulation valve SL(i) as the source pressure is higher than the off pressure Poff for the hydraulic switch SW(i) because of depression of the accelerator pedal 91. Before control for an upshift between shift speeds is started, in addition, the hydraulic pressure Prl(i) to be supplied from the disengagement-side pressure regulation valve SL(i) to a clutch or the like as the disengagement-side engagement element, that is, the holding pressure, is also higher than the off pressure Poff for the hydraulic switch SW(i). In this case, as illustrated in the drawing, the disengagement pressure command value Prl(i)* for the disengagement-side pressure regulation valve SL(i) becomes equal to or less than the off pressure Poff for the hydraulic switch SW(i) slightly after control for an upshift between shift speeds is started by the speed change control module 210 (time t0 in FIG. 7). If no abnormality is caused in the disengagement-side pressure regulation valve SL(i), the hydraulic pressure Prl(i) is reduced as indicated by the thick solid line in FIG. 7, and the hydraulic pressure Prl(i) has become equal to or less than the off pressure Poff, and the hydraulic switch SW(i) has been turned off, at time t1 when the standby time tref has elapsed since time t0 in FIG. 7 even if there is a delay in response of Psl(i) to the disengagement pressure command value Prl(i)*.

Figure 8:
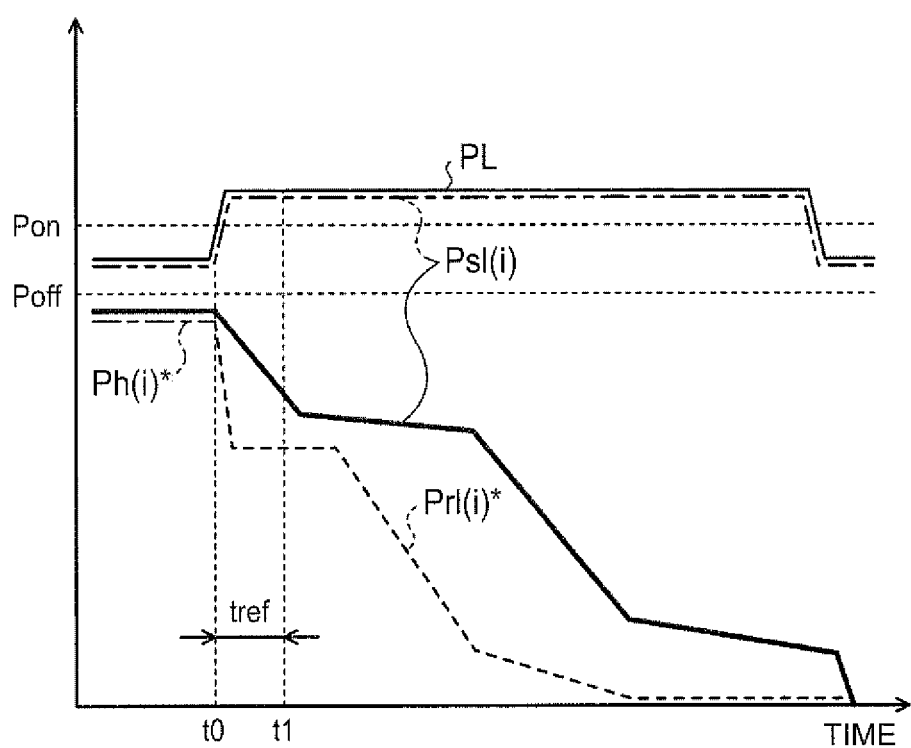
FIG. 8 is a time chart illustrating how the hydraulic pressure Psl(i) from the disengagement-side pressure regulation valve SL(i) etc. are varied in a change between shift speeds for a case where the accelerator off state is continued since before a change between shift speeds.

FIG. 8 illustrates how the hydraulic pressure Psl(i) from the disengagement-side pressure regulation valve SL(i) etc. are varied in a downshift between shift speeds for a case where the accelerator off state is continued since before a change between shift speeds such as a downshift (downcoasting or manual downshifting) from the fourth speed to the third speed performed during coasting in the accelerator off state, for example. In the example of FIG. 8, before control for a downshift between shift speeds is started by the speed change control module 210, the line pressure PL supplied to the disengagement-side pressure regulation valve SL(i) as the source pressure is lower than the on pressure Pon for the hydraulic switch SW(i) because of release of depression of the accelerator pedal 91. Before control for a downshift between shift speeds is started, in addition, the holding pressure command value Ph(i)* and the hydraulic pressure Prl(i) supplied from the disengagement-side pressure regulation valve SL(i) to a clutch or the like as the disengagement-side engagement element, that is, the holding pressure, are also lower than the off pressure Poff for the hydraulic switch SW(i) (see the thick solid line in FIG. 8). In such a case, as illustrated in the drawing, the disengagement pressure command value Prl(i)* for the disengagement-side pressure regulation valve SL(i) is equal to or less than the off pressure Poff for the hydraulic switch SW(i) since control for a downshift between shift speeds is started by the speed change control module 210 (time t0 in FIG. 8). If no abnormality is caused in the disengagement-side pressure regulation valve SL(i), the hydraulic switch SW(i) has been turned off at time t1 when the standby time tref has elapsed since time t0 in FIG. 8 even if there is a delay in response of the hydraulic pressure Psl(i) to the disengagement pressure command value Prl(i)*.

In the case where it is determined in step S210 that the ON/OFF flag Fsw(i) for the hydraulic switch SW(i) has a value of 1 and the hydraulic switch SW(i) is on, on the other hand, the abnormality determination module 220 increments the counter corresponding to the hydraulic switch SW(i) (step S220), and determines whether or not a counted value n(i) of the counter corresponding to the hydraulic switch SW(i) is equal to or more than a threshold N (for example, a value of 3) determined in advance (step S230). In the case where the counted value n(i) of the counter is less than the threshold N (for example, a value of 3), the abnormality determination module 220 stops the change between shift speeds such as a downshift from the fourth speed to the third speed or an upshift from the fourth speed to the fifth speed, for example, transmits a shifting stop command for maintaining the current shift speed SR to the speed change control module 210 (step S240), and terminates the routine.

That is, in the case where it is determined in step S210 that the hydraulic switch SW(i) is on, the hydraulic pressure Psl(i) for the disengagement-side pressure regulation valve SL(i), which should intrinsically be reduced when the standby time tref has elapsed since the disengagement pressure command value Prl(i)* for the disengagement-side pressure regulation valve SL(i) becomes equal to or less than the off pressure Poff for the hydraulic switch SW(i), remains high. In such a case, the disengagement-side pressure regulation valve SL(i) may be unable to reduce its output pressure (hydraulic pressure Prl(i)) because the disengagement-side pressure regulation valve SL(i) is stuck open or the like, for example. Therefore, in the case where it is determined in step S210 that the hydraulic switch SW(i) is on, a change between shift speeds is stopped and the shift speed of the automatic transmission 25 is maintained at the current shift speed SR in order to secure safety.

For example, in the example of FIG. 7, before control for an upshift between shift speeds is started by the speed change control module 210, the line pressure PL supplied to the disengagement-side pressure regulation valve SL(i) as the source pressure is higher than the on pressure Pon for the hydraulic switch SW(i), that is, the hydraulic switches SW1 to SW4, because of depression of the accelerator pedal 91, and the line pressure PL is continuously maintained at a high level during a change between shift speeds (from the start to the completion of shifting). Thus, in the case where the disengagement-side pressure regulation valve SL(i) is unable to reduce its output pressure (hydraulic pressure Prl(i)) because the disengagement-side pressure regulation valve SL(i) is stuck open or the like, for example, the line pressure PL which is higher than the on pressure Pon for the hydraulic switch SW(i) is output from the disengagement-side pressure regulation valve SL(i), and the hydraulic switch SW(i) is on (see the dash-double-dot line in FIG. 7), when the standby time tref has elapsed (time t1 in FIG. 7) since the disengagement pressure command value Prl(i)* for the disengagement-side pressure regulation valve SL(i) becomes equal to or less than the off pressure Poff for the hydraulic switch SW(i) (time t0 in FIG. 7).

In the example of FIG. 8, meanwhile, before control for a downshift between shift speeds is started by the speed change control module 210, the line pressure PL supplied to the disengagement-side pressure regulation valve SL(i) as the source pressure is lower than the on pressure Pon for the hydraulic switch SW(i) because of release of depression of the accelerator pedal 91. In such a case, as discussed above, the linear solenoid valve SLT is controlled such that the line pressure PL as the source pressure to be supplied to the first to fourth linear solenoid valves SL1 to SL4 (such as the engagement-side pressure regulation valve and the disengagement-side pressure regulation valve) during a change between shift speeds (from the start to the completion of shifting) reaches the during-shifting required value which is higher than the on pressure Pon. Thus, also in the case where the disengagement-side pressure regulation valve SL(i) is unable to reduce its output pressure (hydraulic pressure Prl(i)) because the disengagement-side pressure regulation valve SL(i) is stuck open or the like, for example, the line pressure PL which is higher than the on pressure Pon for the hydraulic switch SW(i) is output from the disengagement-side pressure regulation valve SL(i), and the hydraulic switch SW(i) is on (see the dash-double-dot line in FIG. 8), when the standby time tref has elapsed (time t1 in FIG. 8) since the disengagement pressure command value Prl(i)* for the disengagement-side pressure regulation valve SL(i) becomes equal to or less than the off pressure Poff for the hydraulic switch SW(i) (time t0 in FIG. 8).

After it is once determined by the routine of FIG. 5 that an abnormality is caused in the disengagement-side pressure regulation valve SL(i) in the manner discussed above, the routine of FIG. 5 is further executed a plurality of times (if N=3, twice) with the disengagement-side pressure regulation valve SL(i) determined as the abnormality determination target. In the case where it is determined in step S230 in each execution of step S210 that the hydraulic switch SW(i) is on, it is determined that the counted value n(i) is equal to or more than the threshold N. In the case where it is determined that the counted value n(i) is equal to or more than the threshold N, the abnormality determination module 220 transmits to the speed change control module 210 a command signal for bringing the automatic transmission 25 into a neutral state by stopping supply of power to all of the first to fourth linear solenoid valves SL1 to SL4, turns on a predetermined failure flag (step S250), and terminates the routine. In the case where the failure flag is turned on in step S250, the speed change ECU 21 thereafter controls the hydraulic control device 50 etc. in a limp home mode determined in advance.

With the hydraulic control device 50, as has been described above, it is determined that an abnormality is caused in the disengagement-side pressure regulation valve SL(i) (steps S210 to S250) in the case where the hydraulic switch SW(i) corresponding to the disengagement-side pressure regulation valve SL(i) is on when the standby time tref has elapsed since the disengagement pressure command value Prl(i)* for the disengagement-side pressure regulation valve SL(i) becomes equal to or less than the off pressure Poff for the hydraulic switch SW(i), the disengagement-side pressure regulation valve SL(i) corresponding to one of the clutches C1 to C3 and the brakes B1 and B2 to be disengaged in a change between shift speeds. That is, in the case where the hydraulic switch SW(i) is on when the standby time tref has elapsed since the disengagement pressure command value Prl(i)* for the disengagement-side pressure regulation valve SL(i) becomes equal to or less than the off pressure Poff for the hydraulic switch SW(i), the hydraulic pressure (output pressure) Psl(i) for the disengagement-side pressure regulation valve SL(i) remains high when it should intrinsically be reduced even if there is a delay in response of the hydraulic pressure Prl(i) to the disengagement pressure command value Prl(i)*, and thus the disengagement-side pressure regulation valve SL(i) may be considered to be unable to reduce its output pressure Psl(i) because the disengagement-side pressure regulation valve SL(i) is stuck open or the like, for example. Thus, with the hydraulic control device 50, it is possible to accurately determine the presence or absence of an abnormality of the disengagement-side pressure regulation valve SL(i) involved in shifting during a change between shift speeds.

In addition, the on pressure Pon for the hydraulic switches SW1 to SW4 is lower than the line pressure PL as the source pressure to be supplied to the disengagement-side pressure regulation valve SL(i), one (engagement-side pressure regulation valve) of the first to fourth linear solenoid valves SL1 to SL4 corresponding to a clutch or the like to be engaged, and one of the first to fourth linear solenoid valves SL1 to SL4 corresponding to a clutch or the like to be maintained in the engaged state during a change between shift speeds. Consequently, in the case where the disengagement-side pressure regulation valve SL(i) is unable to reduce its output pressure (hydraulic pressure Psl (i)), the hydraulic switch SW(i) corresponding to the disengagement-side pressure regulation valve SL(i) is turned on when a change between shift speeds is started. Further, the off pressure Poff for the hydraulic switches SW1 to SW4 is lower than the on pressure Pon, and higher than the holding pressure supplied from the disengagement-side pressure regulation valve SL(i) to a clutch or the like corresponding to the disengagement-side pressure regulation valve SL(i) before a change between shift speeds in the case where the accelerator off state is continued since before the change between shift speeds (see FIG. 8). Consequently, in a change between shift speeds performed in the case where the accelerator off state is continued since before the change between shift speeds, the hydraulic switch SW(i) corresponding to the disengagement-side pressure regulation valve SL(i) is off when the change between shift speeds is started if no abnormality is caused in the disengagement-side pressure regulation valve SL(i). Thus, according to such a configuration, it is possible to determine the presence or absence of an abnormality of the disengagement-side pressure regulation valve SL(i) after the standby time tref elapses since the start of a change between shift speeds. Therefore, it is possible to more quickly determine the presence or absence of an abnormality of the disengagement-side pressure regulation valve SL(i) compared to a case where the disengagement pressure command value Prl(i) for the disengagement-side pressure regulation valve SL(i) becomes equal to or less than the off pressure Poff for the hydraulic switch SW(i) corresponding to the disengagement-side pressure regulation valve SL(i) after a change between shift speeds is started. As a result, it is possible to more quickly determine the presence or absence of an abnormality of the disengagement-side pressure regulation valve SL(i) in a change between shift speeds performed during continuation of the accelerator off state, in which a large speed reduction shock due to so-called three-element simultaneous engagement tends to be caused, particularly in the case where a clutch or the like corresponding to the disengagement-side pressure regulation valve SL(i) is not disengaged.

In the embodiment described above, in the case where the line pressure PL as the source pressure to be supplied to the disengagement-side pressure regulation valve SL(i) before a change between shift speeds is lower than the on pressure Pon for the hydraulic switch SW(i), the line pressure PL as the source pressure to be supplied to the disengagement-side pressure regulation valve SL(i) during a change between shift speeds is set to the during-shifting required value described above which is higher than the on pressure Pon. Consequently, it is possible to reliably turn on the hydraulic switch SW(i) corresponding to the disengagement-side pressure regulation valve SL(i) after the start of a change between shift speeds in the case where the disengagement-side pressure regulation valve SL(i) is unable to reduce the hydraulic pressure (output pressure) Psl(i) irrespective of the magnitude of the source pressure supplied to the disengagement-side pressure regulation valve SL(i) before the change between shift speeds. In addition, by setting the standby time tref to be longer as the oil temperature Toil is lower as in the embodiment described above, it is possible to more adequately execute an abnormality determination for the disengagement-side pressure regulation valve SL(i) with the standby time tref matching the viscosity of hydraulic oil.

As illustrated in FIGS. 7 and 8, in the case where the holding pressure supplied from the disengagement-side pressure regulation valve SL(i) to a clutch or the like corresponding to the disengagement-side pressure regulation valve SL(i) before a change between shift speeds is lower than the off pressure Poff for the hydraulic switch SW(i) (see FIG. 7), the standby time tref described above may be set to be shorter than that for a case where the holding pressure is higher than the off pressure Poff (see FIG. 8). Consequently, in the case where the holding pressure supplied from the disengagement-side pressure regulation valve SL(i) to a clutch or the like corresponding to the disengagement-side pressure regulation valve SL(i) before a change between shift speeds is lower than the off pressure Poff for the hydraulic switch SW(i), it is possible to further more quickly determine the presence or absence of an abnormality of the disengagement-side pressure regulation valve SL(i) by reducing the standby time tref by the time taken by the holding pressure to fall below the off pressure Poff.

In the embodiment described above, hydraulic pressures for the clutches C1 to C3 and the brakes B1 and B2 of the automatic transmission 25 are directly controlled (set) by a corresponding one of the first, second, third, and fourth linear solenoid valves SL1, SL2, SL3, and SL4. However, it is a matter of course that the present invention may also be applied to hydraulic control devices including pressure regulation valves other than the linear solenoid valves discussed above. Further, the on pressure Pon and the off pressure Poff for the hydraulic switches SW1 to SW4 may be different among the valves.

Here, the correspondence between the main elements of the embodiment and the main elements of the invention described in the "SUMMARY OF THE INVENTION" section will be described. That is, in the embodiment described above, the hydraulic control device 50 which controls hydraulic pressures for the plurality of clutches C1 to C3 and the brakes B1 and B2 included in the automatic transmission 25 mounted on the automobile 10 to establish a plurality of shift speeds corresponds to the "hydraulic control device". The first to fourth linear solenoid valves SL1 to SL4 which each regulate a hydraulic pressure for a corresponding element among the clutches C1 to C3 and the brakes B1 and B2 correspond to the "pressure regulation valves". The plurality of hydraulic switches SW1 to SW4 which are provided for the first to fourth linear solenoid valves SL1 to SL4, respectively, and which are turned on when the output pressure of a corresponding one of the first, second, third, and fourth linear solenoid valves SL1, SL2, SL3, and SL4 is equal to or more than the on pressure Pon determined in advance and turned off when the output pressure of the corresponding linear solenoid valve is equal to or less than the off pressure Poff determined in advance correspond to the "hydraulic switches". The speed change control module 210 of the speed change ECU 21 which sets the disengagement pressure command value Prl(i)* for the disengagement-side pressure regulation valve SL(i) corresponding to a clutch or the like to be disengaged in a change between shift speeds corresponds to the "speed change control means". The abnormality determination module 220 which determines that an abnormality is caused in the disengagement-side pressure regulation valve SL(i) in the case where the hydraulic switch SW(i) is on when the standby time tref has elapsed since the disengagement pressure command value Prl(i)* for the disengagement-side pressure regulation valve SL(i) becomes equal to or less than the off pressure Poff for the corresponding hydraulic switch SW(i) corresponds to the "abnormality determination means".

The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the modes for carrying out the invention described in the "SUMMARY OF THE INVENTION" section. That is, the embodiment is merely a specific example of the invention described in the "SUMMARY OF THE INVENTION" section, and the invention described in the "SUMMARY OF THE INVENTION" section should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

INDUSTRIAL APPLICABILITY

The present invention can be utilized in the industry for the manufacture of automatic transmissions and hydraulic control devices.

The invention claimed is:

1. A hydraulic control device that controls a hydraulic pressure for a plurality of friction engagement elements included in an automatic transmission mounted on a vehicle to establish a plurality of shift speeds, comprising:
   a plurality of pressure regulation valves that each regulate a hydraulic pressure for a corresponding element among the plurality of friction engagement elements;
   a plurality of hydraulic switches that are each provided for a corresponding one of the pressure regulation valves and that are each turned on when an output pressure of the corresponding pressure regulation valve is equal to or more than an on pressure determined in advance and turned off when the output pressure is equal to or less than an off pressure determined in advance, wherein the off pressure is configured to be lower than the on pressure;
   speed change controller configured to set a disengagement pressure command value for a disengagement-side pressure regulation valve, the disengagement-side pressure regulation valve being a pressure regulation valve from among the plurality of pressure regulation valves that corresponds to a disengagement-side friction engagement element to be disengaged in a change between the shift speeds and configured to regulate a source pressure to be a hydraulic pressure for the disengagement-side friction engagement element; and abnormality determination device configured to determine that an abnormality is caused in the disengagement-side pressure regulation valve in the case where a disengagement-side hydraulic switch is on when a predetermined time has elapsed since the disengagement pressure command value for the disengagement-side pressure regulation valve becomes equal to or less than the off pressure for the disengagement-side hydraulic switch, the disengagement-side hydraulic switch being a hydraulic switch from among the plurality of hydraulic switches that corresponds to the disengagement-side pressure regulation valve, wherein in the case where a source pressure supplied to the disengagement-side pressure regulation valve before a change between the shift speeds is lower than an on pressure for the disengagement-side hydraulic switch, the source pressure supplied to the disengagement-side pressure regulation valve during the change between the shift speeds is set to be higher than the on pressure.

2. The hydraulic control device according to claim 1, wherein
the on pressure for the disengagement-side hydraulic switch is lower than a source pressure to be supplied to the disengagement-side pressure regulation valve during the change between the shift speeds, and the off pressure for the disengagement-side hydraulic switch is lower than the on pressure, and higher than a holding pressure supplied from the disengagement-side pressure regulation valve to the disengagement-side friction engagement element before the change between the shift speeds under predetermined conditions.

3. The hydraulic control device according to claim 2, wherein
the off pressure for the disengagement-side hydraulic switch is higher than the holding pressure supplied from the disengagement-side pressure regulation valve to the disengagement-side friction engagement element before the change between the shift speeds in the case where an accelerator off state is continued since before the change between the shift speeds.

4. The hydraulic control device according to claim 1, wherein
the predetermined time is set to be longer as a temperature of hydraulic oil is lower.

5. The hydraulic control device according to claim 1, wherein
in the case where a holding pressure supplied from the disengagement-side pressure regulation valve to the disengagement-side friction engagement element before the change between the shift speeds is lower than the off pressure for the disengagement-side hydraulic switch, the predetermined time is set to be shorter than that for a case where the holding pressure is higher than the off pressure.

6. A hydraulic control device that controls a hydraulic pressure for a plurality of friction engagement elements included in an automatic transmission mounted on a vehicle to establish a plurality of shift speeds, comprising:

a plurality of pressure regulation valves that each regulate a hydraulic pressure for a corresponding element among the plurality of friction engagement elements;

a plurality of hydraulic switches that are each provided for a corresponding one of the pressure regulation valves and that are each turned on when an output pressure of the corresponding pressure regulation valve is equal to or more than an on pressure determined in advance and turned off when the output pressure is equal to or less than an off pressure determined in advance;

speed change controller configured to set a disengagement pressure command value for a disengagement-side pressure regulation valve, the disengagement-side pressure regulation valve being a pressure regulation valve from among the plurality of pressure regulation valves that corresponds to a disengagement-side friction engagement element to be disengaged in a change between the shift speeds and configured to regulate a source pressure to be a hydraulic pressure for the disengagement-side friction engagement element; and abnormality determination device configured to determine that an abnormality is caused in the disengagement-side pressure regulation valve in the case where a disengagement-side hydraulic switch is on when a predetermined time has elapsed since the disengagement pressure command value for the disengagement-side pressure regulation valve becomes equal to or less than the off pressure for the disengagement-side hydraulic switch, the disengagement-side hydraulic switch being a hydraulic switch from among the plurality of hydraulic switches that corresponds to the disengagement-side pressure regulation valve, wherein the on pressure for the disengagement-side hydraulic switch is lower than a source pressure to be supplied to the disengagement-side pressure regulation valve during the change between the shift speeds, and the off pressure for the disengagement-side hydraulic switch is lower than the on pressure, and higher than a holding pressure supplied from the disengagement-side pressure regulation valve to the disengagement-side friction engagement element before the change between the shift speeds under predetermined conditions.

7. A hydraulic control device that controls a hydraulic pressure for a plurality of friction engagement elements included in an automatic transmission mounted on a vehicle to establish a plurality of shift speeds, comprising:

a plurality of pressure regulation valves that each regulate a hydraulic pressure for a corresponding element among the plurality of friction engagement elements;

a plurality of hydraulic switches that are each provided for a corresponding one of the pressure regulation valves and that are each turned on when an output pressure of the corresponding pressure regulation valve is equal to or more than an on pressure determined in advance and turned off when the output pressure is equal to or less than an off pressure determined in advance;

speed change controller configured to set a disengagement pressure command value for a disengagement-side pressure regulation valve, the disengagement-side pressure regulation valve being a pressure regulation valve from among the plurality of pressure regulation valves that corresponds to a disengagement-side friction engagement element to be disengaged in a change between the shift speeds and configured to regulate a source pressure to be a hydraulic pressure for the disengagement-side friction engagement element; and abnormality determination device configured to determine that an abnormality is caused in the disengagement-side pressure regulation valve in the case where a disengagement-side hydraulic switch is on when a predetermined time has elapsed since the disengagement pressure command value for the disengagement-side pressure regulation valve becomes equal to or less than the off pressure for the disengagement-side hydraulic switch, the disengagement-side hydraulic switch being a hydraulic switch from among the plurality of hydraulic switches that corresponds to the disengagement-side pressure regulation valve, wherein in the case where a holding pressure supplied from the disengagement-side pressure regulation valve to the disengagement-side friction engagement element before the change between the shift speeds is lower than the off pressure for the disengagement-side hydraulic switch, the predetermined time is set to be shorter than that for a case where the holding pressure is higher than the off pressure.

* * * * *